United States Patent
Garg

(10) Patent No.: US 8,185,274 B2
(45) Date of Patent: May 22, 2012

(54) ENVIRONMENT CUSTOMIZATION WITH EXTENSIBLE ENVIRONMENT-SETTINGS DATA

(75) Inventor: Parag Garg, Woodenville, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 12/050,916

(22) Filed: Mar. 18, 2008

(65) Prior Publication Data

US 2009/0240395 A1 Sep. 24, 2009

(51) Int. Cl.
*B60R 21/00* (2006.01)
(52) U.S. Cl. .............................. 701/49; 701/36
(58) Field of Classification Search ............ 701/36
See application file for complete search history.

(56) References Cited

U.S. PATENT DOCUMENTS

| | | | |
|---|---|---|---|
| 6,430,488 B1 | 8/2002 | Goldman et al. | |
| 6,640,169 B2 * | 10/2003 | Bergmann et al. | 701/36 |
| 6,663,010 B2 | 12/2003 | Chene et al. | |
| 6,718,240 B1 | 4/2004 | Suda et al. | |
| 6,886,044 B1 * | 4/2005 | Miles et al. | 709/238 |
| 6,895,316 B2 | 5/2005 | Chen et al. | |
| 6,968,333 B2 * | 11/2005 | Abbott et al. | 1/1 |
| 7,039,511 B1 * | 5/2006 | Kreuz et al. | 701/36 |
| 7,050,795 B2 | 5/2006 | Wiegand et al. | |
| 7,139,660 B2 | 11/2006 | Sarkar et al. | |
| 7,283,902 B2 | 10/2007 | Heider et al. | |
| 7,289,611 B2 | 10/2007 | Iggulden et al. | |
| 7,533,082 B2 * | 5/2009 | Abbott et al. | 1/1 |
| 7,860,621 B2 * | 12/2010 | Decke et al. | 701/36 |
| 2002/0055833 A1 * | 5/2002 | Sterling | 703/22 |
| 2002/0087525 A1 * | 7/2002 | Abbott et al. | 707/3 |
| 2003/0120397 A1 * | 6/2003 | Bergmann et al. | 701/1 |
| 2003/0131069 A1 * | 7/2003 | Lucovsky et al. | 709/217 |
| 2004/0044454 A1 | 3/2004 | Ross et al. | |
| 2005/0278366 A1 * | 12/2005 | Horvitz et al. | 707/100 |
| 2006/0036642 A1 * | 2/2006 | Horvitz et al. | 707/102 |
| 2006/0038447 A1 | 2/2006 | Bruelle-Drews | |
| 2006/0089755 A1 | 4/2006 | Ampunan et al. | |
| 2006/0136393 A1 * | 6/2006 | Abbott et al. | 707/3 |
| 2006/0182055 A1 * | 8/2006 | Coffee et al. | 370/328 |
| 2006/0195483 A1 | 8/2006 | Heider et al. | |
| 2007/0093924 A1 * | 4/2007 | Engel et al. | 700/104 |
| 2008/0125937 A1 * | 5/2008 | Decke et al. | 701/36 |
| 2008/0167801 A1 * | 7/2008 | Geelen et al. | 701/201 |
| 2008/0306645 A1 * | 12/2008 | Dewhurst et al. | 701/29 |
| 2009/0157522 A1 * | 6/2009 | Srinivasan et al. | 705/26 |

OTHER PUBLICATIONS

Mihira, "Development of Total Vehicle Management System (FTSS)", No. 10, Japan Science and Technology Agency, 2006-2007, pp. 6.

\* cited by examiner

*Primary Examiner* — Shelley Chen
(74) *Attorney, Agent, or Firm* — Alleman Hall McCoy Russell & Tuttle LLP

(57) ABSTRACT

Environment customization includes downloading extensible environment-settings data from a data-storage device and adjusting one or more environmental parameters defined by the extensible environment-settings data. The extensible environment-settings data is amended to include previously undefined settings, and the amended extensible environment-settings data is uploaded to the data-storage device.

19 Claims, 4 Drawing Sheets

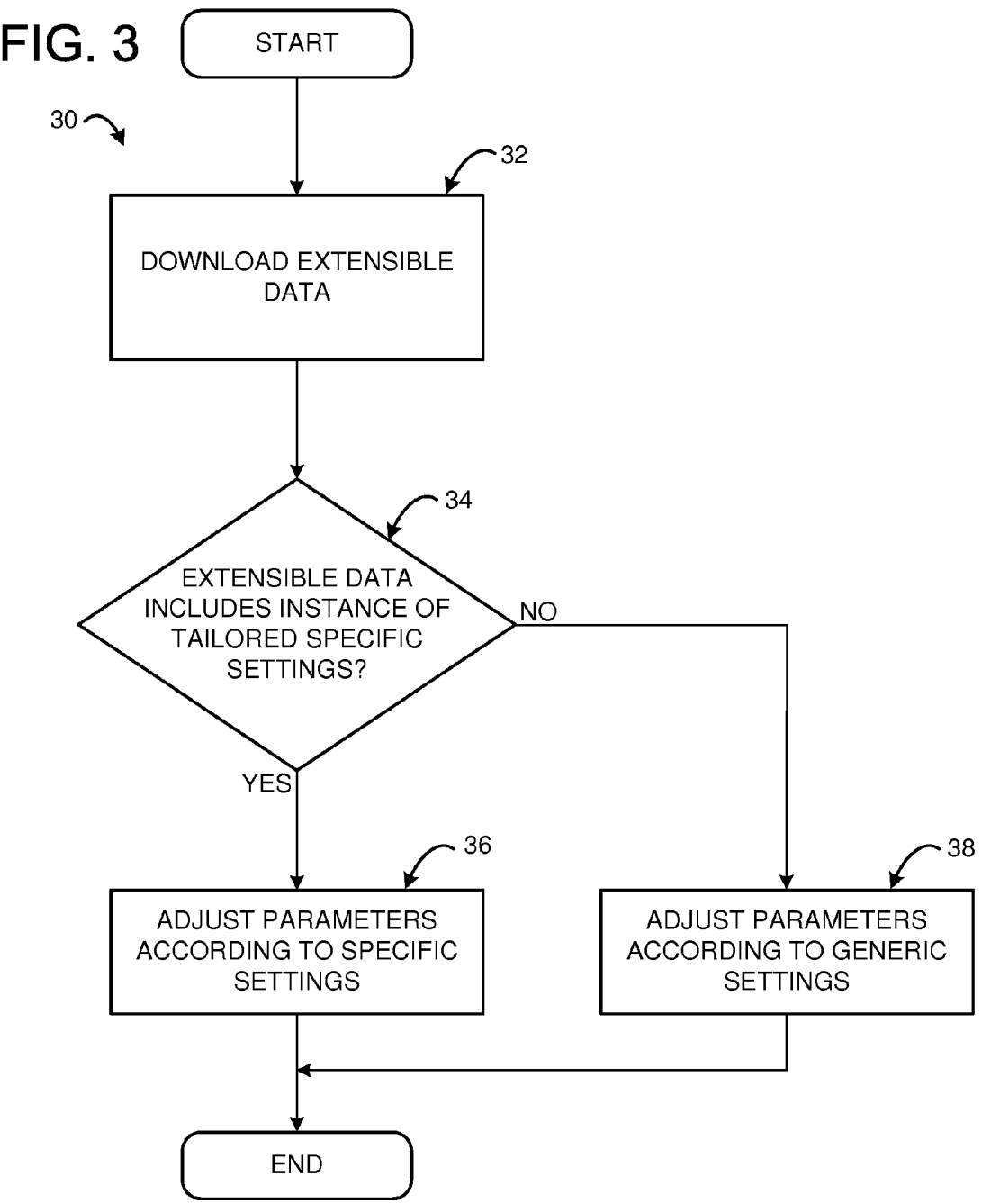

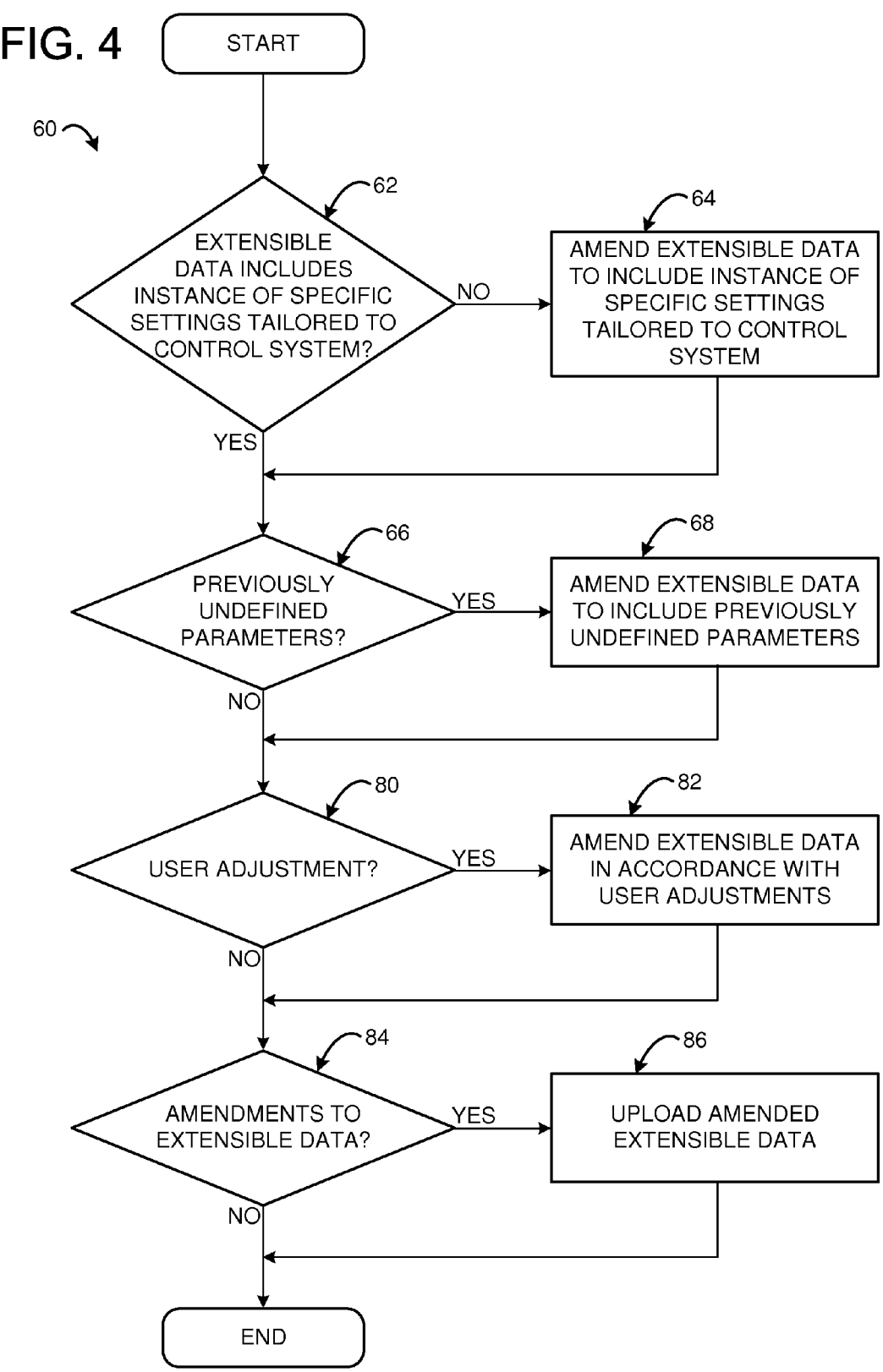

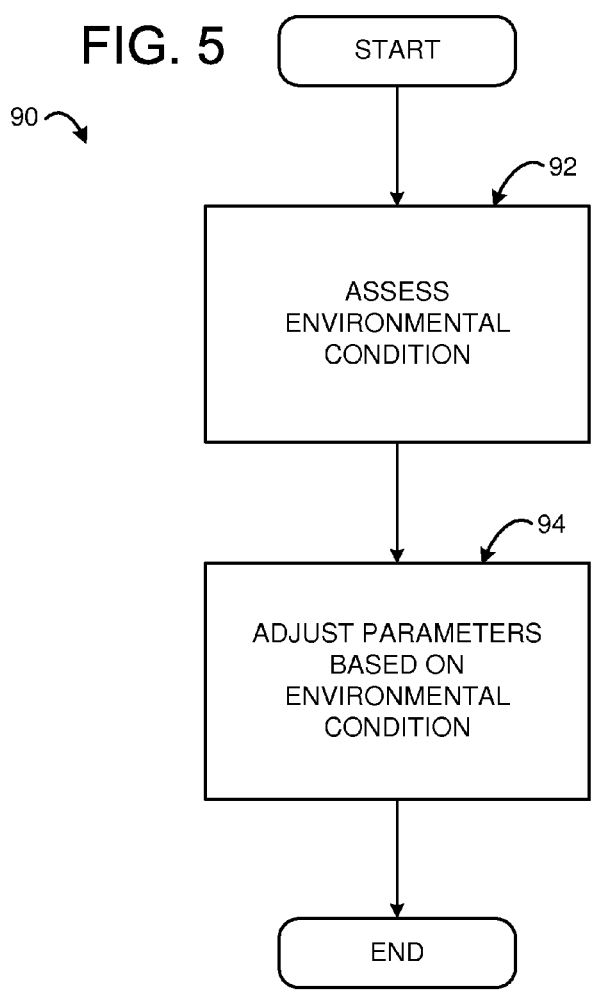
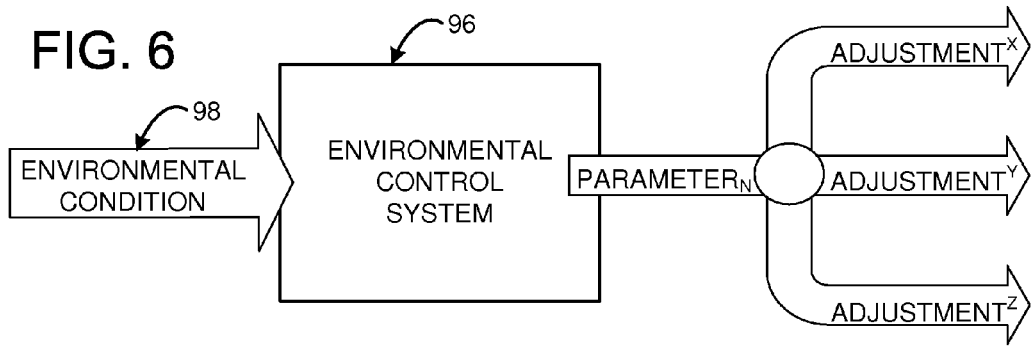

ENVIRONMENT CUSTOMIZATION WITH EXTENSIBLE ENVIRONMENT-SETTINGS DATA

BACKGROUND

People enjoy customizing the environments in which they spend their time. Environment customization can increase the comfort of a person in a particular environment. As an example, workers often like to carefully select the height of their chairs, the tilt of their computer monitors, the volume of their speakers, and any number of different other environmental parameters. As another example, drivers may wish to adjust the position of their seats, the presets of their radio, the addresses saved in their navigation systems, and any number of different environmental parameters. Furthermore, there are countless other environments that people enjoy customizing.

Often times, customizing an environment can take a substantial amount of time and effort. Therefore, some people think it takes too much effort to customize an environment and settle for uncustomized environments, even though they would prefer customized environments. Other people may go through the hassle of customizing an environment, but then feel frustrated if they have to recustomize an environment that has become uncustomized.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An environment can be customized with the use of extensible environment-settings data. The extensible environment-settings data includes generic and/or environment-specific settings that memorialize the environmental preferences of a user. The extensible environment-settings data can read, and the preferences of a user can be used to customize an environment. Because the environment-settings data is extensible, it may be amended to account for previously undefined user preferences.

BRIEF DESCRIPTION OF THE DRAWINGS

FIG. 3 shows a process flow of an example method for adjusting environmental parameters according to an embodiment of the present disclosure.

FIG. 4 shows a process flow of an example method for amending extensible environment-settings data according to an embodiment of the present disclosure.

FIG. 5 shows a process flow of an example method for adjusting environmental parameters based on environmental conditions according to an embodiment of the present disclosure.

FIG. 6 shows an environmental control system adjusting environmental parameters based on environmental conditions according to an embodiment of the present disclosure.

DETAILED DESCRIPTION

The present disclosure is directed to customizing an environment so that one or more environmental parameters can be automatically adjusted to suit the preferences of a user. As nonlimiting examples, the environmental parameters of a vehicle can be adjusted, or the environmental parameters of a room can be adjusted. To facilitate this type of customization, the preferences of a user can be saved as extensible environment-settings data. The extensible environment-settings data is not only designed to define a set of known environmental parameters, but also to be amended so as to account for previously undefined environmental parameters in an adaptable manner. In this way, the extensible environment-settings data remains useful and relevant, even as it is applied to new and/or different environments.

Figure 1:
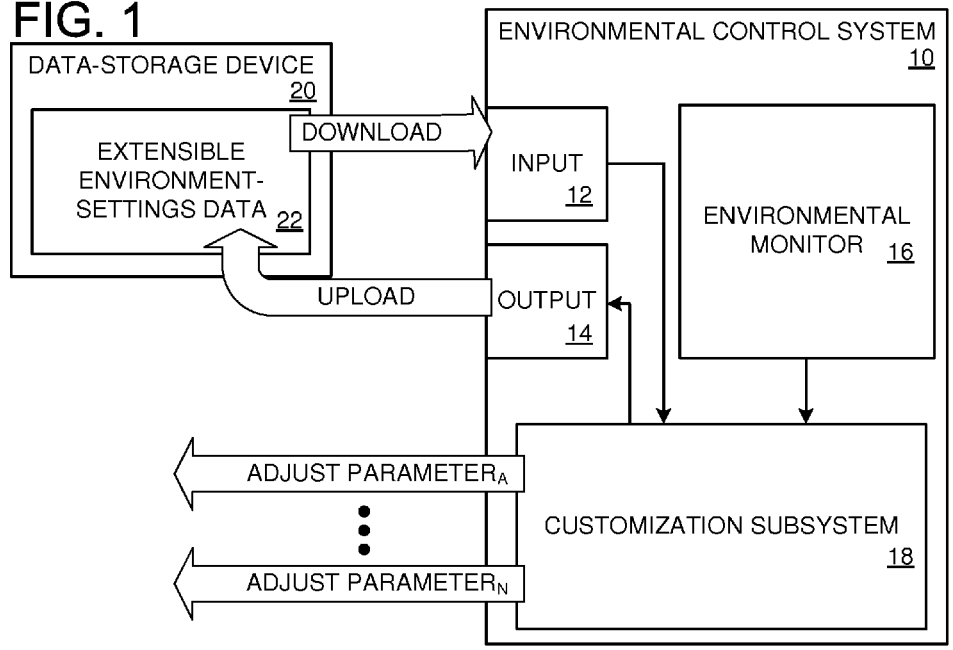
FIG. 1 schematically shows an environmental control system adjusting environmental parameters defined by extensible environment-settings data according to an embodiment of the present disclosure.

FIG. 1 shows a nonlimiting example of an environmental control system 10, which includes an input 12, an output 14, an environmental monitor 16, and a customization subsystem 18. FIG. 1 also shows a data-storage device 20 including extensible environment-settings data 22.

Input 12 can be configured to download extensible environment-settings data 22 from data-storage device 20. The data-storage device may take a variety of different forms without departing from the scope of this disclosure. For example, the data-storage device may be a constituent element of a vehicle key, a portable telephone, a portable storage device, a network storage device and/or server, a portable music player, a personal data assistant, a portable computer, or another suitable device. The data-storage device may be portable, so that it is easy to carry, thus effectively linking saved user preferences to the user. In some embodiments, the data-storage device may be remotely located, but accessible so that user preferences can be retrieved when desired.

User preferences can be stored as extensible environment-settings data 22. In some embodiments, the extensible environment-settings data may be written in extensible markup language (XML). XML allows users and/or environments to define elements and/or settings, and the set of elements and/or settings that are defined can be dynamically updated to include previously undefined elements and/or settings. XML can facilitate the sharing of structured data across different environmental control systems and/or environments. XML can be used to encode settings and to serialize settings data. While XML is an example of a possible data format, it should be understood that other extensible data formats may be used without departing from the scope of this disclosure.

Figure 2:
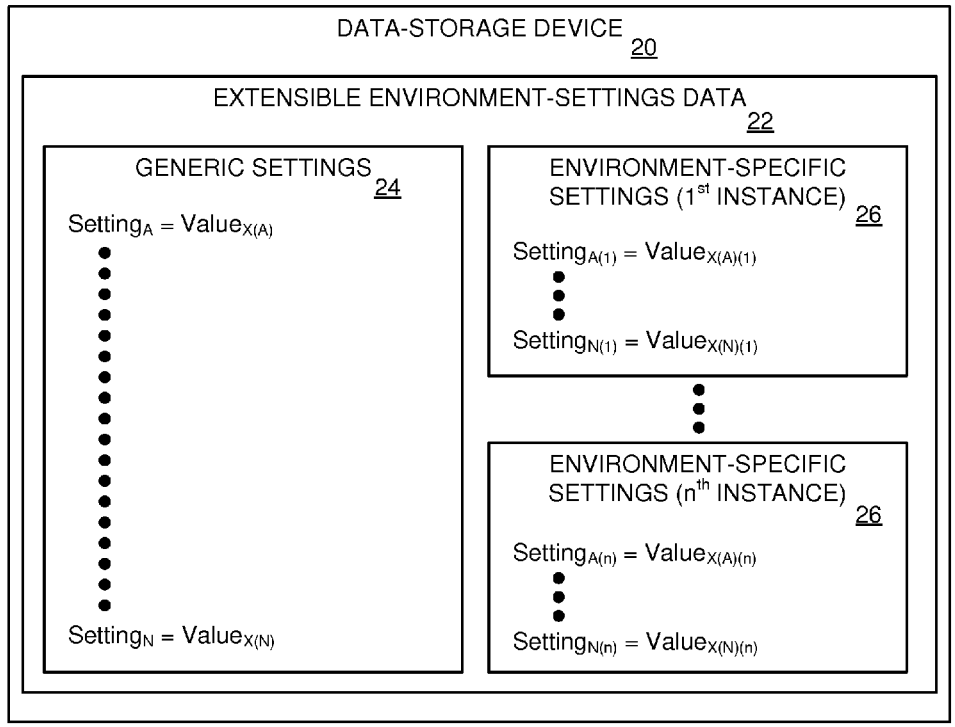
FIG. 2 schematically shows a data-storage device including extensible environment-settings data according to an embodiment of the present disclosure.

FIG. 2 schematically shows data-storage device 20 with extensible environment-settings data 22. In the illustrated embodiment, the extensible environment-settings data includes generic settings 24 and plural instances of environment-specific settings 26. In general, extensible environment-settings data may include generic settings and/or one or more instances of environment-specific settings.

As shown in FIG. 2, generic settings 24 may include one or more settings (e.g., $Setting_A$-$Setting_N$). Each setting can correspond to a different environmental parameter. As used herein, the phrase environmental parameter is used to refer to all customizable aspects of a user's environment. Some environmental parameters are conditions that a user experiences, such as temperature, humidity, lighting, audio, and the like. Other environmental parameters affect how the environment performs for the user.

As an example, in the context of a vehicle environment, nonlimiting examples of environmental parameters include: seat positioning, radio presets, navigation addresses, navigation preferences, garage codes, temperature, speech language, speech gender, door unlock codes, anti-theft codes and alarms, headlight attributes, color schemes, backgrounds, logos, images, interior lighting, steering wheel adjustments, steering wheel turn ratio, steering wheel firmness, brake sensitivity, accelerator sensitivity, and the like.

A user's preference for each environmental parameter can be saved as a value that corresponds to the relevant setting. For example, $Setting_A$ may correspond to a first environmental parameter, and $Value_{X(A)}$ may be used to save a user's preference for the first environmental parameter. Other preferences for other environmental parameters may be accounted for by different settings. In other words, a different setting and corresponding value can be used for each different environmental parameter that is to be customized.

Generic settings can be applied to a plurality of different environments. As a nonlimiting example, generic settings can include a user's generic temperature preference (e.g., 72 degrees Fahrenheit). A plurality of different environments can utilize the generic temperature preference so that the temperature of the environment can be adjusted to the user's generic temperature preference.

As shown in FIG. 2, each instance of environment-specific settings 26 may include one or more settings (e.g., $Setting_{A(1)}$-$Setting_{N(1)}$ for the $1^{st}$ instance, and $Setting_{A(n)}$-$Setting_{N(n)}$ for the $n^{th}$ instance). Each environment-specific setting may correspond to a generic setting. For example, a $1^{st}$ instance of environment-specific settings may include a user's environment-specific temperature preference for a particular environment (e.g., 70 degrees Fahrenheit in specific environment X), which corresponds to the user's generic temperature preference (e.g., 72 degrees Fahrenheit for unspecified environments). The value assigned to the environment-specific setting may be the same as the value assigned to the corresponding generic setting, or the assigned values may be different. A different instance of environment-specific settings can be used to store a user's environment-specific preferences for a plurality of different environments, so that each different environment has its own environment-specific settings. When no environment-specific settings exist for a particular environment, the generic settings can be used and/or environment-specific settings can be created for that environment.

FIG. 3 shows a process flow of a method 30 for adjusting environmental parameters defined by extensible environment-settings data. At 32, the method includes downloading extensible environment-settings data. Such data may include vehicle-settings data, room-settings data, and/or data corresponding to other types of environments.

At 34, the method includes determining if the extensible environment-settings data includes an instance of environment-specific settings that is tailored to the relevant environment. For example, if the relevant environment is an automobile of type X, it will be determined whether the extensible environment-settings data includes an instance of environment-specific settings tailored to a type X automobile.

If the appropriately tailored environment-specific settings are present, at 36, environmental parameters are adjusted according to the environment-specific settings. If the appropriately tailored environment-specific settings are not present, at 38, environmental parameters are adjusted according to the generic settings.

In some embodiments, method 30 can be implemented by a customization subsystem, such as customization subsystem 18 of FIG. 1. For example, customization subsystem 18 may be configured to adjust environmental parameters according to generic settings if the extensible environment-settings data does not include an instance of environment-specific settings tailored to environmental control system 10. Likewise, customization subsystem 18 may be configured to adjust environmental parameters according to an instance of environment-specific settings tailored to environmental control system 10 if the extensible environment-settings data includes an instance of environment-specific settings tailored to environmental control system 10.

The type of adjustment that is made to an environmental parameter depends on the particular environmental parameter. For example, if the environmental parameter is temperature, adjustments can be made by increasing or decreasing the temperature. A customization subsystem may be configured to effectuate such adjustments. For example, customization subsystem 18 may be configured to turn on a heater to increase the temperature or to turn on an air conditioner to decrease a temperature. Temperature is only one nonlimiting example of an adjustable environmental parameter, and it should be understood that a customization subsystem may be configured to effectuate other types of changes to make adjustments to other types of environmental parameters.

Extensible environment-settings data is designed to define a set of known environmental parameters. Furthermore, in order to maintain future compatibility with environments that may include as of yet undefined environmental parameters, the environment-settings data is extensibly amendable so that additional settings can be added to define additional environmental parameters. As an example, an environmental control system may download extensible environment-settings data that does not include a setting defining an environmental parameter that is adjustable by the environmental control system. As such, the customization subsystem of the environmental control system can amend the extensible environment-settings data to include the previously undefined setting.

FIG. 4 shows a process flow of an example method 60 for amending extensible environment-settings data to include previously undefined settings.

At 62, the method includes determining if the extensible environment-settings data includes an instance of environment-specific settings tailored to the environmental control system. If the data does not include such environment-specific settings, at 64, the method includes amending the extensible environment-settings data to include an instance of environment-specific settings tailored to the environmental control system. In this way, the extensible environment-settings data can be updated to include environment-specific data for newly experienced environments. Such environment-specific data may include one or more variations relative to generic settings, thus providing a user with an opportunity to further customize one environment relative to other environments.

At 66, the method includes determining if the extensible environment-settings data includes settings for previously undefined environmental parameters. The previously undefined environmental parameters may be environmental parameters that are adjustable by the environmental control system that is currently utilizing the settings data. Such environmental parameters may not have been adjustable by other environmental control systems using the settings data, and thus, such environmental parameters were previously undefined by the settings data.

If the data does not include settings for the previously undefined parameters, at 68, the method includes amending the extensible environment-settings data to include settings corresponding to the previously undefined environmental parameters. Generic settings may be amended to include a generic preference for the new environmental parameter, and the generic preference subsequently may be used for other new environments that can also make adjustments to the environmental parameter. Furthermore, the environment-specific settings for that particular environment can be amended to include the environment-specific preferences.

At 80, the method includes determining if a user makes an adjustment to an environmental parameter that deviates from a preference defined by the extensible environment-settings data. For example, if the extensible environment-settings include a generic temperature setting, and the temperature setting has a value of 72 degrees Fahrenheit, a user overriding the previously recorded preference of 72 degrees and adjusting the temperature to 70 degrees may indicate a change in the user's preference. As such, at 82, method 60 may further include amending the extensible environment-settings data at least in part by amending settings data in accordance with the user adjustments. Amending the settings data in accordance with user adjustments facilitates maintaining the settings data to accurately reflect a user's preferences, even if such preferences are continually changing.

At 84, method 60 includes determining if amendments are made to the extensible environment-settings data. For example, such amendments may be made at 64, at 68, and/or at 82. If amendments have been made, at 86, the amended extensible environment-settings data can be uploaded to a data-storage device. For example, with reference to FIG. 1, output 14 can be configured to upload the amended extensible environment-settings data to data-storage device 20.

The amended extensible environment-settings data can subsequently be downloaded by a different environmental control system, and that environmental control system can adjust environmental parameters to reflect user preferences as represented by the amended environmental-settings data.

Turning back to FIG. 1, environmental monitor 16 may be configured to assess at least one environmental condition. As nonlimiting examples, the environmental monitor may include a global positioning system for assessing a geographic position of the environmental control system, a thermometer for assessing an outside temperature, a clock for assessing a time, and/or other tools for assessing different environmental conditions.

FIG. 5 is a process flow of a method 90 for selecting customization schemes at least in part based on environmental conditions. At 92, the method includes assessing an environmental condition. As described above, one or more different environmental conditions can be assessed by an environmental monitor.

At 94, method 90 includes adjusting environmental parameters based on the assessed environmental condition. FIG. 6 further demonstrates this concept. In particular, FIG. 6 shows an environmental control system 96 assessing an environmental condition 98. Then, depending on the assessment, the environmental control system makes one of a plurality of different possible adjustments (e.g., ADJUSTMENT$^X$, ADJUSTMENT$^Y$, and ADJUSTMENT$^Z$) to an environmental parameter$_N$. The extensible environment-settings data can include different values for one or more settings, and the different values can be selected based on the assessed environmental condition.

As a nonlimiting example, the geographic position of a vehicle may be an environmental condition that influences a driver's preferences for various vehicle settings. The geographic position can affect which radio presets the driver prefers, what temperature the driver prefers the vehicle cabin, how loudly the horn is set to honk, and/or any number of different environmental parameters. For instance, if the vehicle is in a cold climate, the environmental control system may adjust a vehicle cabin temperature to a relatively hot setting, whereas if the vehicle is in a hot climate, the environmental control system may adjust the vehicle cabin temperature to a relatively cool setting.

The above described use of extensible environment-settings data provides previously unrealized flexibility in environment customization. The extensible environment-settings data can originally account for an initial set of preferences, and is flexible enough to adapt to new and/or different environments by extensibly adding and/or changing the types of preferences defined by the settings. As new and/or different preferences are added to the extensible environment-settings data, the original preferences are not lost or broken in any way. The older environments, for which the settings data is originally configured, may continue to utilize the initial set of preferences without interference and/or confusion caused by the new and/or different settings. The extensible nature of the data allows inapplicable settings to be effectively ignored.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including personal computers, servers, laptop computers, hand-held devices, microprocessor-based programmable consumer electronics and/or appliances, vehicle control systems, home automations systems, office automation systems, etc.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes may be changed without parting from the scope of this disclosure.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A control system for a vehicle, comprising:
   an input configured to download, from a data-storage device, extensible vehicle-settings data including generic settings and one or more instances of vehicle-specific settings;
   a customization subsystem configured:
   to amend the extensible vehicle-settings data to include previously undefined settings, and if an instance of the vehicle-specific settings tailored to the control system is present in the extensible vehicle-settings data, to adjust vehicle parameters according to that instance, but if an instance of the vehicle-specific settings tailored to the control system is not present in the extensible vehicle-settings data, to adjust vehicle parameters according to the generic settings; and an output configured to upload amended extensible vehicle-settings data to the data-storage device.

2. The control system of claim 1, wherein the extensible vehicle-settings data is written in extensible markup language.

3. The control system of claim 1, wherein the customization subsystem is configured, if an instance of the vehicle-specific settings tailored to the control system is not present in the extensible vehicle-settings data, to amend the extensible vehicle-settings data to include such an instance.

4. The control system of claim 1, wherein the customization subsystem is configured to amend the extensible vehicle-settings data to include settings corresponding to vehicle parameters previously undefined by the extensible vehicle-settings data.

5. The control system of claim 1, wherein the customization subsystem is configured to amend the extensible vehicle-settings data at least in part by amending the generic settings in accordance with user adjustments to one or more vehicle parameters.

6. The control system of claim 1, further comprising an environmental monitor configured to assess at least one environmental condition; wherein the customization subsystem is configured to adjust vehicle parameters based on the environmental condition.

7. The control system of claim 6, wherein the at least one environmental condition is geographic position.

8. The control system of claim 6, wherein the at least one environmental condition is temperature.

9. The control system of claim 6, wherein the at least one environmental condition is time.

10. A control system for a vehicle environment, comprising:
an input configured to download, from a data-storage device, extensible vehicle environment-settings data including generic settings and one or more instances of vehicle environment-specific settings;
a customization subsystem configured:
to amend the extensible vehicle environment-settings data to include previously undefined settings, and
if an instance of the vehicle environment-specific settings tailored to the control system is present in the extensible vehicle environment-settings data, to adjust vehicle environmental parameters according to that instance, but if an instance of the vehicle environment-specific settings tailored to the control system is not present in the extensible vehicle environment-settings data, to adjust vehicle environmental parameters according to the generic settings; and an output configured to upload amended extensible vehicle environment-settings data to the data-storage device.

11. The control system of claim 10, wherein the extensible vehicle environment-settings data is written in extensible markup language.

12. The control system of claim 10, wherein the customization subsystem is configured, if an instance of the vehicle environment-specific settings tailored to the control system is not present in the extensible vehicle environmental-settings data, to amend the extensible vehicle environment-settings data to include such an instance.

13. The control system of claim 10, wherein the customization subsystem is configured to amend the extensible vehicle environment-settings data to include settings corresponding to vehicle environmental parameters previously undefined by the extensible vehicle environment-settings data.

14. The control system of claim 10, wherein the customization subsystem is configured to amend the extensible vehicle environment-settings data at least in part by amending the generic settings in accordance with user adjustments to one or more vehicle environmental parameters.

15. A method of customizing a vehicle experience, comprising:
downloading, from a data-storage device, extensible vehicle-settings data including generic settings and one or more instances of vehicle-specific settings;
if an instance of the vehicle-specific settings tailored to the control system is present in the extensible vehicle-settings data, to adjust vehicle parameters according to that instance, but
if an instance of the vehicle-specific settings tailored to the control system is not present in the extensible vehicle-settings data, to adjust vehicle parameters according to the generic settings;
amending the extensible vehicle-settings data to include previously undefined settings; and
uploading amended extensible vehicle-settings data to the data-storage device.

16. The control system of claim 1, wherein the data-storage device is removable from the vehicle.

17. The control system of claim 1, wherein the data-storage device is a network device.

18. The control system of claim 1, wherein the data-storage device is one or more of a cell phone and a music player.

19. The control system of claim 10, wherein the vehicle environment is a room.

* * * * *